United States Patent
Taylor (12) 
(10) Patent No.: US 6,359,716 B1
(45) Date of Patent: Mar. 19, 2002

(54) ALL-OPTICAL ANALOG FM OPTICAL RECEIVER

(75) Inventor: Robert B. Taylor, Woburn, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/256,954

(22) Filed: Feb. 24, 1999

(51) Int. Cl.⁷ ............................................. H04B 10/06
(52) U.S. Cl. ........................ 359/189; 359/193; 359/195
(58) Field of Search ............................. 359/189, 193, 359/195

(56) References Cited

U.S. PATENT DOCUMENTS

| | | | |
|---|---|---|---|
| 5,128,790 A | * 7/1992 | Heidemann et al. | 359/132 |
| 5,162,937 A | * 11/1992 | Heidemann et al. | 359/124 |
| 5,359,412 A | 10/1994 | Schulz | 356/345 |
| 5,373,389 A | * 12/1994 | Huber | 359/195 |
| 5,526,158 A | * 6/1996 | Lembo | 359/161 |
| 5,594,577 A | 1/1997 | Majima et al. | 359/124 |
| 5,710,651 A | * 1/1998 | Logan, Jr. | 359/145 |
| 5,777,771 A | * 7/1998 | Smith | 359/180 |
| 5,896,216 A | * 4/1999 | Kikushima et al. | 359/182 |
| 5,917,636 A | * 6/1999 | Wake et al. | 359/180 |
| 5,940,196 A | * 8/1999 | Piehler et al. | 359/133 |
| 6,115,162 A | * 9/2000 | Graves et al. | 359/173 |

FOREIGN PATENT DOCUMENTS

WO    WO95/28043    10/1995

\* cited by examiner

*Primary Examiner*—Leslie Pascal
*Assistant Examiner*—Hanh Phan
(74) *Attorney, Agent, or Firm*—Testa, Hurwitz & Thibeault, LLP (57) ABSTRACT

Method and apparatus for an analog FM optical link having a low noise figure and a high spurious-free dynamic range. In one embodiment, the apparatus includes a FM DFB laser and a balanced receiver. The balanced receiver includes an optical splitter to split the received beam into two optical paths. Each of the two paths includes an optical filter and a photodetector. A differentiator coupled to the electrical output of the photodetectors produces a demodulated electrical signal in response to the RF signal used to modulate the DFB laser. This configuration can eliminate the laser relative intensity noise and second order harmonics. In addition, third order distortion is eliminated when there is no intensity modulation or greatly reduced when intensity modulation is present.

17 Claims, 6 Drawing Sheets

ALL-OPTICAL ANALOG FM OPTICAL RECEIVER

GOVERNMENT SUPPORT

This invention was made with government support under Contract Number F19628-95-C-0002 awarded by the Department of the Air Force. The government may have certain rights in the invention.

FIELD OF THE INVENTION

The invention relates generally to an apparatus and method for an optical communications system, and in particular, to an analog frequency modulated (FM) optical receiver.

BACKGROUND OF THE INVENTION

Communication systems based on optical technologies are becoming more common due to advantages over conventional wire-based communication systems. Although digital optical links can provide high data bandwidths, in some implementations analog optical links are preferred, for example where providing digital processing capability at the transmitter is impractical.

An analog optical link can exhibit an unacceptable noise figure (NF) and an unacceptable spurious-signal-free dynamic range (SFDR). For example, conventional Mach-Zehnder modulated optical links are subject in general to second order harmonics and third order difference intermodulation products. Thus a need exists for a simple and inexpensive high performance analog optical link having a low noise figure and a high SFDR.

SUMMARY OF THE INVENTION

The present invention relates to an apparatus and method for all-optical, frequency modulated (FM) communication. The method and apparatus make use of a balanced receiver configuration having a set of optical filters. An optical beam splitter provides an optical signal to two distinct optical filters. One optical filter removes the upper sideband and the other optical filter removes the lower sideband. The filtered signals are detected and their photocurrents subtracted before the resulting electrical signal is provided to a differentiator for demodulation. Laser relative intensity noise (RIN) and second order harmonics are thereby eliminated. In addition, third order distortion is eliminated when no intensity modulation (IM) is present, or greatly reduced when IM is present, As a result, this analog optical link has a low noise figure and a high spurious-signal-free dynamic range.

The present invention features a transmitter for an optical communication system which includes a FM optical signal source and an optical filter in communication with the FM source. The optical filter produces a single sideband optical signal. In one embodiment the transmitter also includes a beamsplitter and a second optical filter. The beamsplitter is in optical communication with the FM optical signal source and has a first and second beam output. Each optical filter is in communication with a respective beam output and removes one sideband of the FM optical signal.

The invention also features a receiver for an optical communication system which includes an optical filter, a photodetector in optical communication with the filter, and a differentiator in electrical communication with the photodetector. The optical filter removes one sideband of a FM optical signal to produce a single sideband FM optical signal and the differentiator produces a demodulated electrical signal in response to the single sideband FM optical signal. In one embodiment the receiver also includes a beamsplitter and a second optical filter. The beamsplitter is in optical communication with the FM optical signal source and has a first and second beam output. Each optical filter is in communication with a respective beam output and produces a respective single sideband FM optical signal in response to the FM optical signal.

The invention also features a communication system which includes a FM optical signal source, an optical filter in optical communication with the FM optical signal source, a photodetector in optical communication with the filter and a differentiator in electrical communication with the photodetector. The differentiator produces a demodulated FM electrical signal in response to the FM optical signal. In one embodiment the system also includes a beam splitter, a second filter and a second photodetector in electrical communication with the differentiator. The differentiator produces a demodulated electrical signal in response to the detected electrical signals from the photodetectors.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DESCRIPTION OF THE INVENTION

Figure 1:
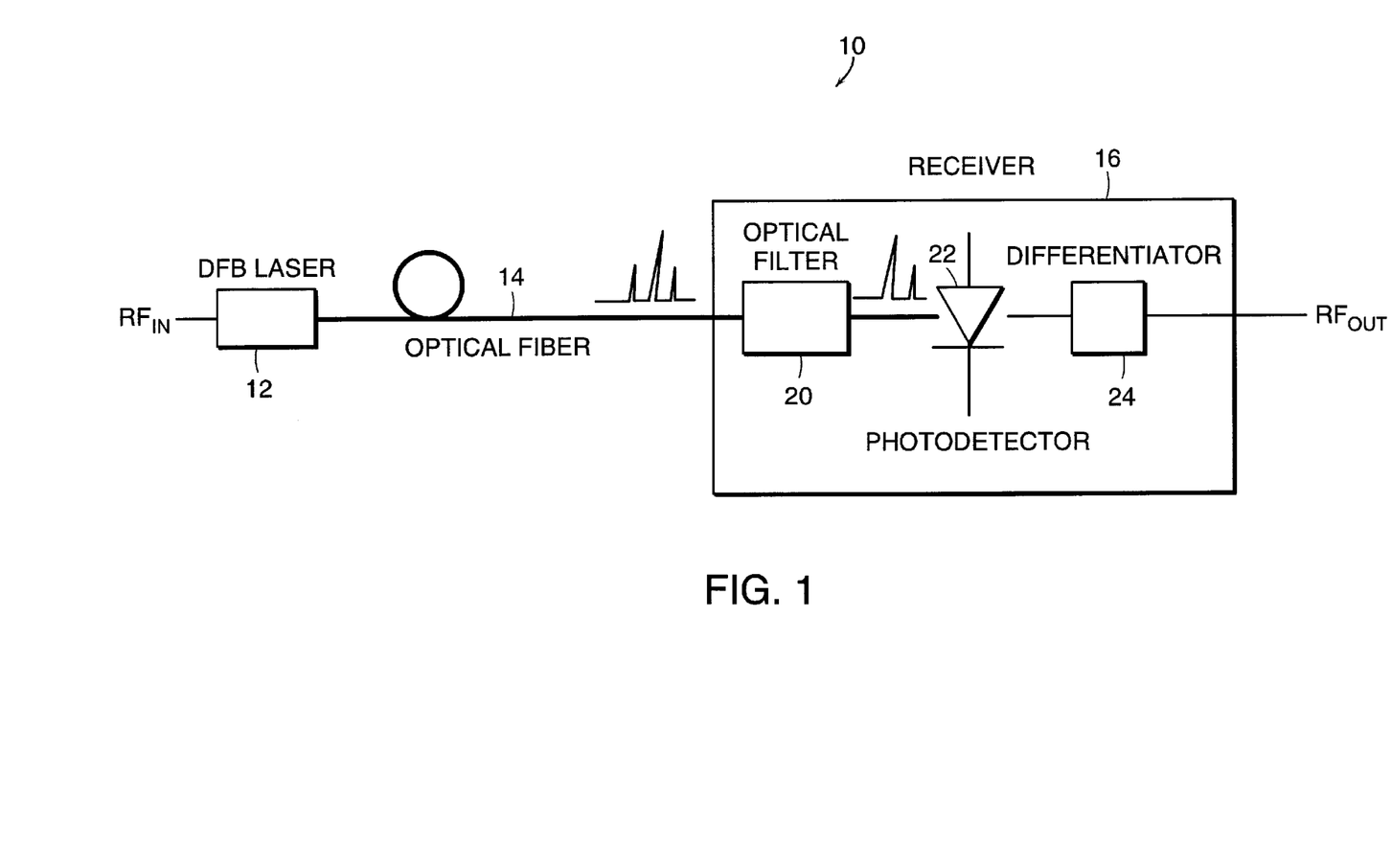
FIG. 1 is a functional block diagram illustrating one embodiment of an all-optical FM analog link.

Referring to FIG. 1, an all-optical FM link 10 includes a laser source 12 which can be directly modulated, an optical fiber 14 and a receiver 16. Preferably, the laser 12 is a distributed feedback (DFB) laser (e.g. KBK Inc., New York, N.Y., DFB laser model no. KLED1563BTB which has a FM response efficiency of 50–500 MHz/mA, depending on the modulation frequency, and a bandwidth up to 3 GHz) which is directly modulated by a RF signal ($RF_{in}$). The resulting modulated optical signal includes both intensity modulation (IM) and frequency modulation (FM). The receiver includes an optical filter 20, a photodetector 22 and a differentiator 24. The optical filter 20 suppresses one sideband of the optical signal and passes both the carrier and the other sideband. As an example, a fiber grating filter can be used in a fiber-based receiver. Generally, any transmissive optical filter with the proper spectral characteristics can be used. Without the optical filter 20 the FM modulation is canceled and only the IM is detected. Demodulation of the electrical signal generated by the photodetector 22 is accomplished with the differentiator 24 and results in an output RF signal ($RF_{out}$) at the receiver output terminal 18.

Other lasers that can be directly modulated and have a single longitudinal mode can be used in place of the conventional DFB laser 12. Semiconductor lasers which satisfy these requirements include, but are not limited to, distributed Bragg reflector (DBR) lasers, external cavity lasers and multiple quantum well (MQW) lasers. In addition, some solid state lasers (e.g., Nd:YAG lasers) can be directly modulated, although the modulation efficiency and modulation bandwidth are typically low.

Unlike a coherent analog FM link, the all-optical FM analog link 10 does not require an additional laser source or strict optical frequency tracking, although the optical frequency must be stable enough to allow proper optical filtering. Laser relative intensity noise (RIN), however, is still present in the demodulated signal ($RF_{out}$)

Figure 2:
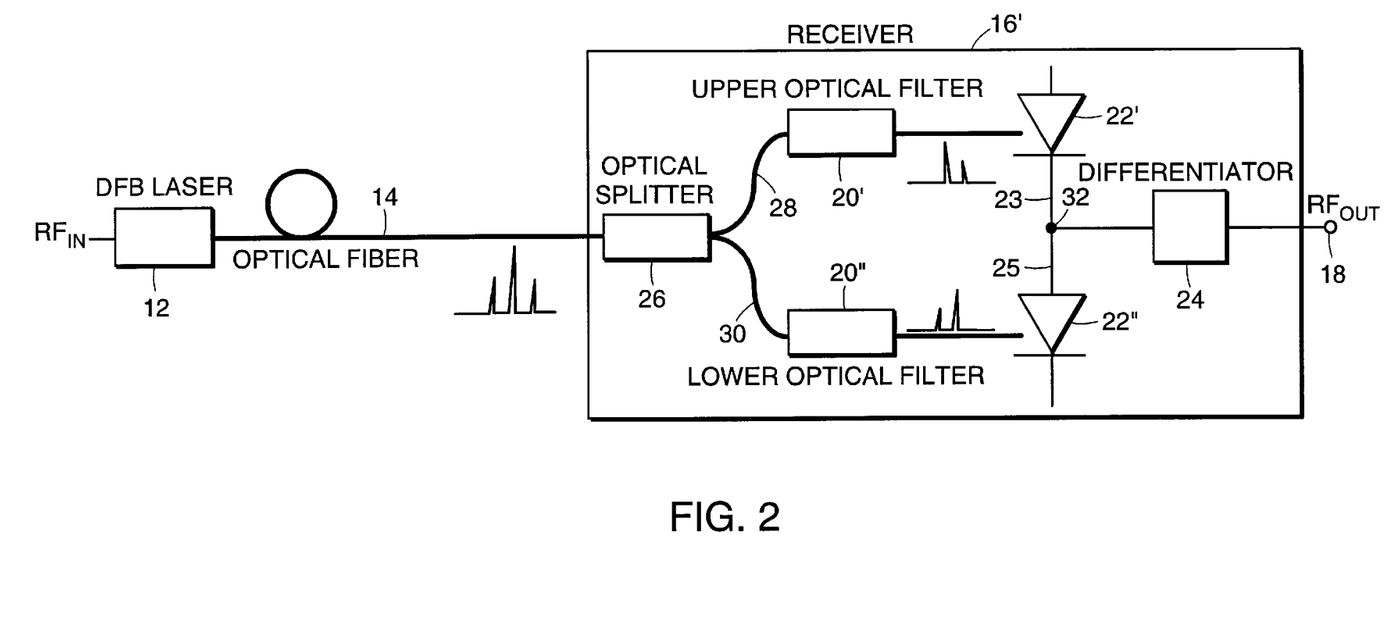
FIG. 2 is a functional block diagram illustrating another embodiment of an all-optical FM analog link.

Referring to FIG. 2, an all-optical FM analog link 10' having a balanced receiver configuration includes a DFB laser 12, an optical fiber 14 and a dual receiver 16'. The dual receiver 16' includes a beamsplitter 26, an upper optical filter 20', a lower optical filter 20', two photodetectors 22' and 22", and a differentiator 24. Modulated light from the optical fiber 14 is split into an upper optical path 28 and a lower optical path 30. The optical paths 28, 30 can include, but are not limited to, optical fiber or a free space path defined by bulk optical components. Light in the upper path 28 passes through the upper filter 20' where the lower sideband is removed from the modulated optical signal. The upper detector 22' receives the filtered single sideband optical signal and generates a corresponding modulated electrical signal at the detector output 23. Similarly, light in the lower path 30 passes through the lower optical filter 20' where the upper sideband is removed from the modulated optical signal. The second detector 22' receives this second filtered single sideband optical signal and generates a corresponding modulated electrical signal at the detector output 25. A resulting sum modulated signal at node 32 is differentiated by the differentiator 24 to generate a demodulated electrical signal ($RF_{out}$) at the receiver output 18.

Figure 3A:
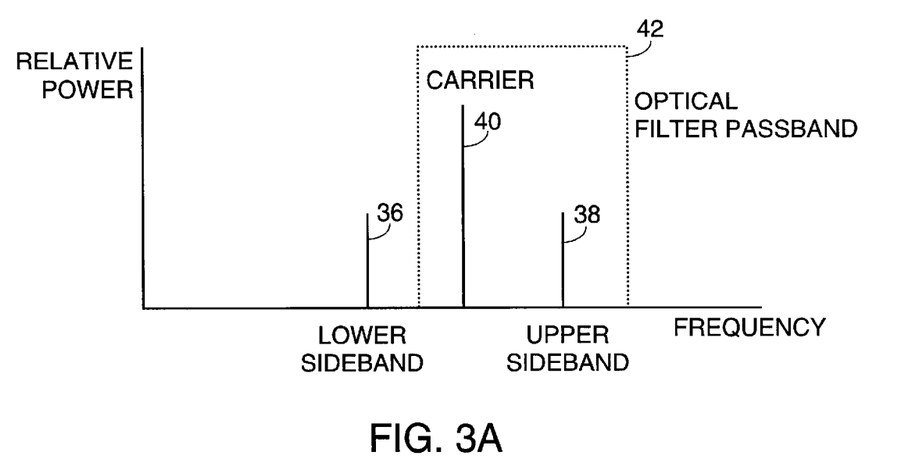
FIGS. 3a–3d are diagrams of the filtered optical spectrums according to the invention.
Figure 3B:
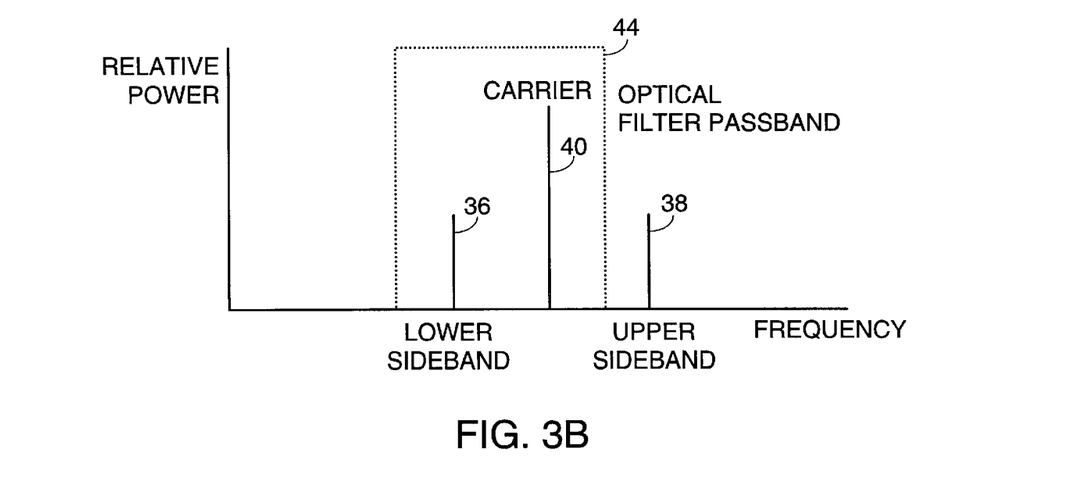

FIG. 3a illustrates how the upper optical filter 20' removes the lower sideband 36 and transmits the upper sideband 38 and carrier 40 which lie within the passband 42 of the filter 20'. Similarly, FIG. 3b illustrates how the lower optical filter 20" removes the upper sideband 38 and transmits the lower sideband 36 and carrier 40 which lie within the passband 44 of the filter 20".

The contribution to the photocurrents generated by the detectors 22', 22" due to RIN are equal because the upper RIN sideband is the same as the lower RIN sideband. Thus one advantage of the balanced receiver configuration 10' is the elimination of RIN. Shot noise and thermal noise in the two paths are not correlated, however, so subtraction of the photocurrents from the detectors 22', 22" does not eliminate these noise components from the demodulated electrical signal $RF_{out}$. Instead, the shot noise and thermal noise present in each optical path 28, 30 are incoherently summed. In addition, second order harmonics and third order distortion are eliminated when no IM is present. Even if IM exists, both second order harmonics and third order distortion are substantially reduced. As a result the balanced receiver configuration 10' has a low noise figure and a high spurious-signal-free dynamic range.

The demodulated RF signal current is given by:

$$i_{sig} = K \Re P_S K_{FM} x_h(t) \quad (1)$$

where K is the efficiency of the differentiator 24, $\Re$ is the photodetector responsivity, $P_S$ is the optical power, $K_{FM}$ is the frequency modulation index and $x_h(t)$ is the normalized RF input signal. The gain of the all-optical FM analog link 10' is given by:

$$G = (\Re P_S)^2 (2\pi \delta_{FM}) \frac{R_{out}}{R_{in}} \quad (2)$$

where ($\delta_{FM}$ is the FM efficiency (MHz/mA) of the laser 12 and $R_{out}$ and $R_{in}$ are the output and input resistance, respectively.

Using the ideal filter model illustrated in FIGS. 3A and 3B, the noise figure is approximated by:

$$NF = \frac{\eta B R_{in}}{(\Re P_S)^2 \left(\frac{\delta_{FM}}{f_c}\right)^2} \quad (3)$$

where η is the receiver noise spectral density, B is the signal bandwidth and $f_c$ is the center frequency of the RF signal ($RF_{in}$).

Figure 3C:
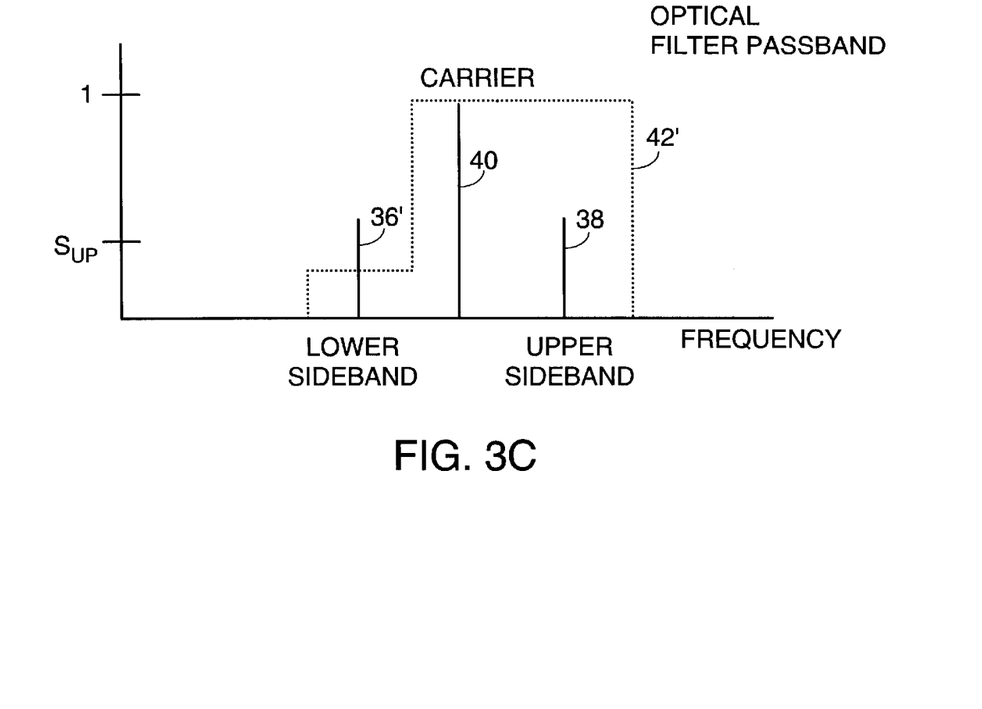
Figure 3D:
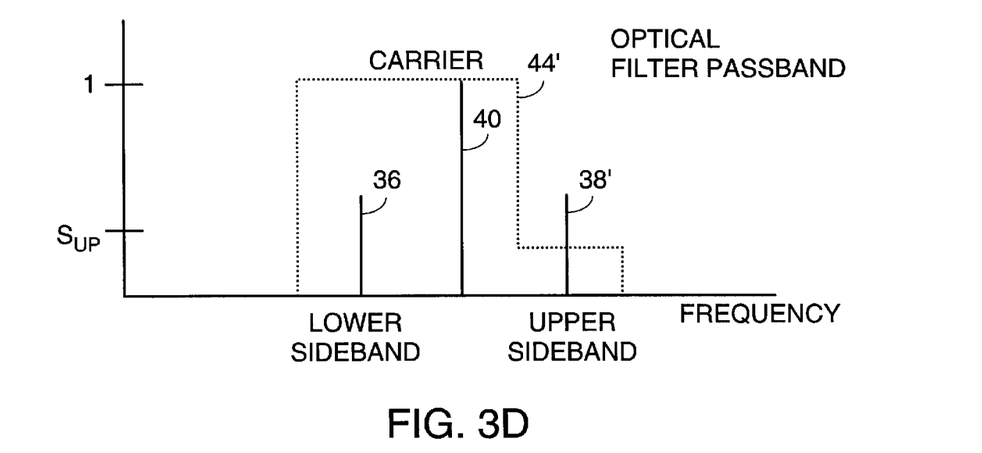

The spurious-signal-free dynamic range can be calculated assuming a more realistic model of the upper optical filter 20' and lower optical filter 20", respectively, as shown in FIGS. 3C and 3D. In particular, the passbands 42',44' result in suppressed sidebands 36',38' with non-zero power contributions $S_{up}$. In addition, the RF input signal ($RF_{in}$) is assumed to be a two-tone signal where the tones are at closely spaced RF frequencies. The spurious-signal-free dynamic range is given by:

$$SFDR = 4\left(\frac{(\Re P_S)^2}{\eta B}\right)^{\frac{2}{3}} \frac{(1-S_{up})^2}{(8C_{IM}^2(1-S_{up}^2)+S_{up}(1-S_{up}))^{\frac{2}{3}}} \quad (4)$$

where $$C_{IM} = \frac{2\pi f_c m}{K_{FM}}$$

and m is the intensity modulation index. While this spurious-signal-free dynamic range depends on the relative values of the FM and AM modulation efficiencies, it will typically be substantially better than conventional links utilizing Mach-Zehnder modulators.

Figure 4:
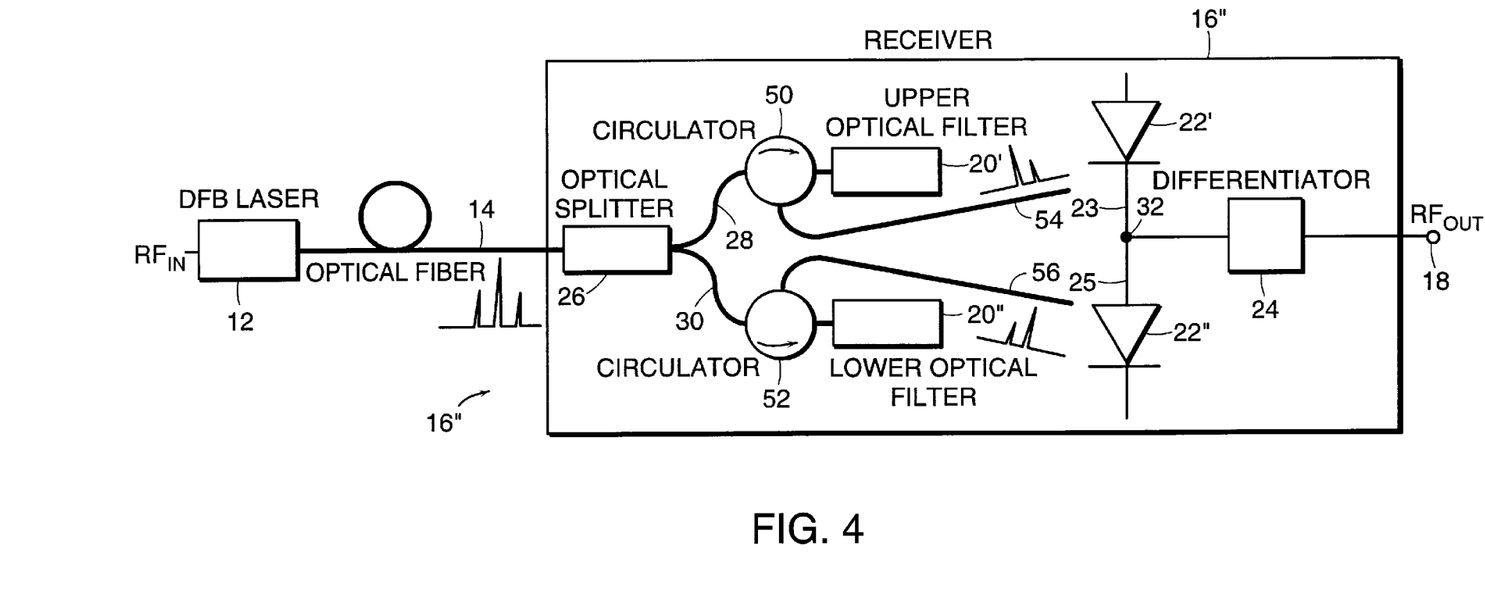
FIG. 4 is a functional block diagram of an embodiment of an all-optical FM analog link using Fabry-Perot filters.

Referring to FIG. 4, another embodiment of a balanced receiver configuration 16" includes an upper optical circulator 50 and lower optical circulator 52 (e.g., Kaifa Technology, Sunnyvale, Calif., optical circulator model no. CIR5-M which has a minimum isolation between ports of 40 dB). Modulated light from the laser 12 transmitted through the optical fiber 14 is split into the upper and lower optical paths 28 and 30, respectively. Light in the upper path 28 passes through the upper optical circulator 50 and is reflected from the upper optical filter 20' except for the lower sideband which is transmitted through the filter 20' and lost. The reflected optical signal having a single sideband enters the upper optical circulator 50 where it is directed into an upper detector optical path 54 and onto the upper detector 22'. Similarly, light in the lower path 30 passes through the lower optical circulator 52 and is reflected from the lower optical filter 20" except for the upper sideband which is transmitted through the filter 20" and lost. This second reflected optical signal also has a single (opposite) sideband and enters the lower optical circulator 52 where it is directed into a lower detector optical path 56 and onto the lower detector 22". As described in the previous embodiment, a demodulated electrical signal ($RF_{out}$) is generated at the receiver output 18. This configuration, however, avoids the carrier attenuation resulting from the transmissive optical filters 20', 20" of the previous embodiment.

Figure 5A:
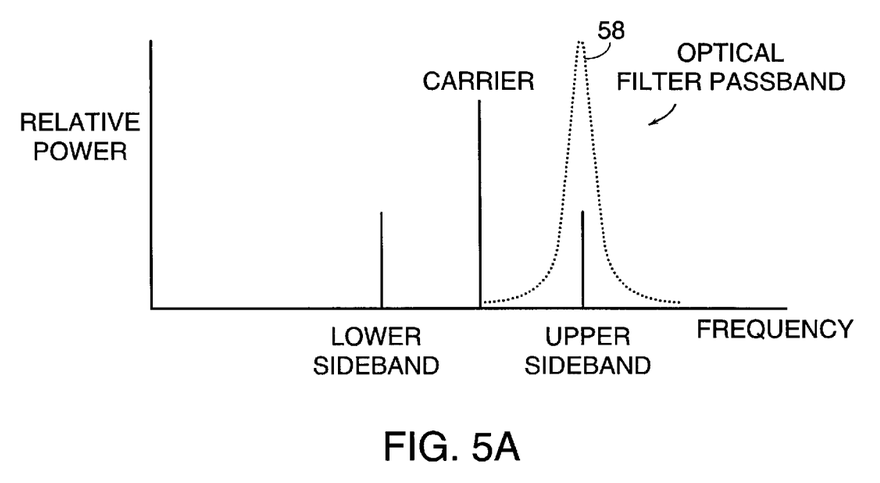
FIGS. 5a and 5b are diagrams of the filtered optical spectrums of the embodiment of FIG. 4.
Figure 5B:
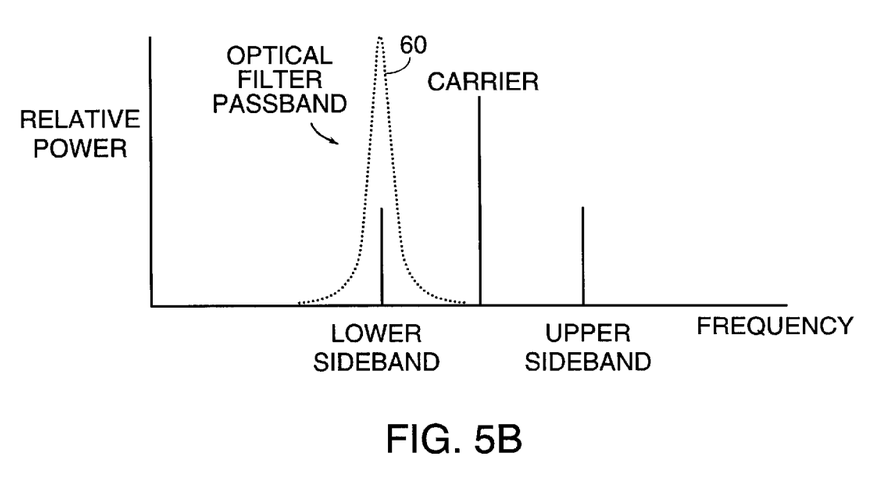

The reflective filters 20', 20" can be the Fabry-Perot type (e.g., Micron Optics, Inc., Atlanta, Ga., tunable filter and controller model no. FFP-TF 1550-050M200-5 for a wavelength of 1550 nm and having a free spectral range of approximately 10 GHz and a finesse of approximately 200). FIGS. 5A and 5B illustrate how the narrow passbands 58, 60 of Fabry-Perot filters transmit a single sideband so that it is removed from the optical signals in the embodiment shown in FIG. 4. Nearly all of the light outside the passbands 58, 60 is reflected back to the optical circulators 50, 52.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A communication system comprising:
   a first single sideband optical filter having an optical input and an optical output, said optical input adapted to receive a FM optical signal;
   a first photodetector having an optical input in optical communication with said optical output of said first filter and having an electrical output;
   a second single sideband optical filter having an optical input and an optical output, said optical input adapted to receive said FM optical signal;
   a second photodetector having an optical input in optical communication with said optical output of said second filter and having an electrical output; and
   a differentiator having an electrical input in electrical communication with said electrical outputs of said first and second photodetectors,
   wherein said differentiator produces a demodulated electrical signal in response to said FM optical signal.

2. The communication system of claim 1 wherein said first optical filter comprises:
   an optical circulator having an optical input, an optical output and an etalon port, said optical circulator optical input in optical communication with said optical input of said first filter,
   wherein said FM optical signal at said optical circulator input is transmitted out said optical circulator etalon port; and
   a Fabry-Perot etalon having an optical input in optical communication with said optical circulator etalon port,
   wherein said FM optical signal from said optical circulator etalon port is at least partially reflected from said Fabry-Perot etalon back into said optical circulator etalon port and out from said optical circulator output.

3. The communication system of claim 1 further comprising a FM optical signal source generating said optical signal.

4. The transmitter of claim 3 wherein said FM optical signal source comprises a distributed feedback laser.

5. The transmitter of claim 1 wherein said first optical filter comprises a Fabry-Perot filter.

6. The transmitter of claim 1 wherein said first optical filter comprises a fiber grating filter.

7. The communication system of claim 1, wherein said first and second optical filters each have a bandwidth sufficient to transmit a carrier and a sideband of said optical signal.

8. The second photodetector of claim 1 further comprising an electrical input in communication with the electrical output of the first photodetector.

9. A method of transmitting an optical signal comprising the steps of:
   providing a FM optical signal having a carrier and two sidebands;
   optically filtering said FM optical signal to produce a first single sideband FM optical signal with the upper sideband removed;
   optically filtering said FM optical signal to produce a second single sideband FM optical signal with the lower sideband removed; and
   combining the first single sideband signal and the second single sideband signal, thereby reducing relative intensity noise in said FM optical signal.

10. A communication system comprising:
    a FM optical signal source producing a FM optical signal at an optical output;
    a beam splitter having an optical input in optical communication with said optical output of said FM optical signal source and having a first beam output and a second beam output;
    a first optical filter having an optical input in optical communication with said first beam output and having an optical output,
    wherein said first optical filter produces a first single sideband FM optical signal in response to said FM optical signal;
    a second optical filter having an optical input in optical communication with said second beam output and having an optical output,
    wherein said second optical filter produces a second single sideband FM optical signal in response to said FM optical signal;
    a first photodetector having an optical input in optical communication with said first filter optical output and having an electrical output,
    wherein said first photodetector produces a first detected electrical signal in response to said first single sideband FM optical signal;
    a second photodetector having an optical input in optical communication with said second filter optical output and having an electrical output,
    wherein said second photodetector produces a second detected electrical signal in response to said second single sideband FM optical signal; and
    a differentiator having an electrical input in electrical communication with said first and second photodetector electrical outputs,
    wherein said differentiator produces a demodulated electrical signal in response to said first and second detected electrical signals.

11. The communication system of claim 10 wherein said FM optical signal source comprises a distributed feedback laser.

12. A method of communication comprising the steps of:
    providing a FM optical signal having a lower sideband, an upper sideband and a carrier;
    splitting said FM optical signal to produce a first signal beam and a second signal beam;
    optically filtering said first signal beam to remove said lower sideband to produce a first filtered beam;
    optically filtering said second signal beam to remove said upper sideband to produce a second filtered beam;

detecting said first filtered beam to produce a first detected signal;

detecting said second filtered beam to produce a second detected signal;

combining said first and second detected signals to produce a combined signal; and differentiating said combined signal to produce a demodulated signal.

13. A transmitter for an optical communication system comprising:

a FM optical signal source producing a FM optical signal at an optical output;

a beam splitter having an optical input in optical communication with said optical output of said FM optical signal source and having a first beam output and a second beam output;

a first optical filter having an optical input in optical communication with said first beam output, wherein said first optical filter removes one sideband of said FM optical signal to produce a first single sideband FM optical signal; and a second optical filter having an optical input in optical communication with said second beam output, wherein said second optical filter removes one sideband of said FM optical signal to produce a second single sideband FM optical signal.

14. The transmitter of claim 13 wherein said FM optical signal source comprises a distributed feedback laser.

15. A method of transmitting an optical signal comprising the steps of:

providing a FM optical signal having a lower sideband, an upper sideband and a carrier;

splitting said FM optical signal to produce a first signal beam and a second signal beam;

optically filtering said first signal beam to remove said lower sideband to produce a first filtered beam; and optically filtering said second signal beam to remove said upper sideband to produce a second filtered beam.

16. A receiver for an optical communication system comprising:

a beam splitter having an optical input, a first beam output and a second beam output;

a first optical filter having an optical output in optical communication with said first beam output and having an optical output, wherein said first optical filter produces a first single sideband FM optical signal in response to a FM optical signal received at said beam splitter optical input;

a second optical filter having an optical output in optical communication with said second beam output and having an optical output, wherein said second optical filter produces a second single sideband FM optical signal in response to said FM optical signal;

a first photodetector having an optical input in optical communication with said first filter optical output and having an electrical output, wherein said first photodetector produces a first detected electrical signal in response to said first single sideband FM optical signal;

a second photodetector having an optical input in optical communication with said second filter optical output and having an electrical output, wherein said second photodetector produces a second detected electrical signal in response to said second single sideband FM optical signal; and a differentiator having an electrical input in electrical communication with said first and second photodetector electrical outputs, wherein said differentiator produces a demodulated electrical signal in response to said first and second detected electrical signals.

17. A method of receiving an optical signal comprising the steps of:

splitting a FM optical signal having a lower sideband, an upper sideband and a carrier to produce a first signal beam and a second signal beam;

optically filtering said first signal beam to remove said lower sideband to produce a first single sideband FM optical signal;

optically filtering said second signal beam to remove said upper sideband to produce a second single sideband FM optical signal;

detecting said first single sideband FM optical signal to produce a first detected electrical signal;

detecting said second single sideband FM optical signal to produce a second detected electrical signal;

combining said first and second detected electrical signals to produce a combined electrical signal; and differentiating said combined electrical signal to produce a demodulated signal.

* * * * *